(12) United States Patent
Meintjes et al.

(10) Patent No.: US 8,501,018 B2
(45) Date of Patent: Aug. 6, 2013

(54) METHOD AND APPARATUS FOR SEPARATING A MULTI-COMPONENT STREAM

(75) Inventors: Paul Meintjes, Secunda (ZA); Johannes Buys, Pretoria (ZA)

(73) Assignee: Sasol Technology (Pty) Ltd, Rosebank, Johannesburg (ZA)

( * ) Notice: Subject to any disclaimer, the term of this patent is extended or adjusted under 35 U.S.C. 154(b) by 722 days.

(21) Appl. No.: 12/534,603

(22) Filed: Aug. 3, 2009

(65) Prior Publication Data
US 2011/0024282 A1 Feb. 3, 2011

(51) Int. Cl.
*B01D 21/02* (2006.01)

(52) U.S. Cl.
USPC ........... 210/800; 210/801; 210/803; 210/114; 210/521; 210/532.1; 210/537; 210/538; 95/253; 95/259; 96/183

(58) Field of Classification Search
USPC ............... 203/40; 95/253; 518/700, 715; 210/800–804, 513, 521–522, 533–534, 537, 210/532.1, 538; 96/183–186
See application file for complete search history.

(56) References Cited

U.S. PATENT DOCUMENTS

| | | | | |
|---|---|---|---|---|
| 3,255,574 A | * | 6/1966 | Glasgow | 95/252 |
| 6,673,135 B2 | * | 1/2004 | West | 95/268 |
| 7,078,439 B2 | * | 7/2006 | Odueyungbo et al. | 518/700 |
| 2003/0125396 A1 | * | 7/2003 | Espinoza et al. | 518/726 |
| 2009/0282985 A1 | * | 11/2009 | Whiteley | 96/189 |
| 2010/0145114 A1 | * | 6/2010 | Abhari et al. | 585/1 |

FOREIGN PATENT DOCUMENTS

| | | |
|---|---|---|
| CN | 2201979 Y | 6/1995 |
| CN | 2505474 Y | 8/2002 |

* cited by examiner

*Primary Examiner* — Duane Smith
*Assistant Examiner* — Cabrena Hall
(74) *Attorney, Agent, or Firm* — Knobbe Martens Olson & Bear, LLP

(57) ABSTRACT

A process vessel is provided for separating a multi-component stream. The process vessel includes an inlet for permitting introduction of reaction water stream into the vessel and an outlet for withdrawing a water-rich phase from the vessel. The vessel further includes a plurality of draw-off points for drawing off a phase rich in suspended hydrocarbons from the vessel, the draw-off point(s) being located above the outlet.

26 Claims, 2 Drawing Sheets

METHOD AND APPARATUS FOR SEPARATING A MULTI-COMPONENT STREAM

FIELD OF THE INVENTION

This invention relates to a method and an apparatus for separating a multi-component stream.

BACKGROUND OF THE INVENTION

South African patent number 2004/5318 claims a process for purifying a water-rich stream produced during a Fischer-Tropsch reaction. The process includes the use of a distillation column in which at least a fraction of non-acid chemicals (NACs) from at least a fraction of a gaseous raw product produced during a Fischer-Tropsch (FT) reaction is separated into an NAC-rich phase and an aqueous phase.

Prior to being fed to the distillation column, the gaseous raw product from the Fischer-Tropsch process is condensed and pre-treated to remove hydrocarbons in the $C_5$ to $C_{20}$ range.

This separation takes place in a three-phase separator. The three streams exiting the separator are: a tail gas, a hydrocarbon condensate including mainly hydrocarbons in the $C_5$ to $C_{20}$ range, and a so-called reaction water stream containing NACs, water, acids and suspended hydrocarbons.

The suspended hydrocarbons are subsequently separated from the reaction water stream using an oil coalescer, typically a Pall coalescer.

Should the suspended hydrocarbons contained in the reaction water stream (typically from 0.05 to 1% by mass) not be removed prior to distillation, they may cause instabilities in the distillation column or may contaminate the bottom product thereby causing said product to not meet the required specifications on hydrocarbon content.

During operation of the abovementioned process, it has been found that the mass fraction of suspended hydrocarbons in the reaction water stream is too large for the coalescer to handle, so that some hydrocarbons break through into the distillation column.

It has further unexpectedly been found that catalyst fines from the Fischer-Tropsch process remain suspended in the reaction water stream, which causes damage to process equipment and can lead to undesired side reactions in the distillation column as a portion of the catalyst fines may still be active.

The inventors therefore believe that a need exists for providing a method and an apparatus for separating suspended hydrocarbons and catalyst fines from the reaction water stream prior to feeding the stream to the distillation column.

In the specification that follows, the term "reaction water stream" is to be understood as meaning a stream derived from a Fischer-Tropsch reaction after exiting a three-phase separator as described above, including streams which have been separated therefrom e.g. in a Pall coalescer, and which reaction water stream contains NACs, water, acids, suspended solids, and suspended hydrocarbons.

SUMMARY OF THE INVENTION

According to the invention there is provided a method of separating a multi-component stream, the method including at least the steps of:

feeding a reaction water stream to a process vessel via an inlet located at a calming zone of said vessel;

allowing the reaction water stream to remain in the vessel for a minimum residence time of four hours to allow the reaction water stream to separate into a phase rich in suspended hydrocarbons and a water-rich phase and to allow suspended solids to settle out of the reaction water stream;

withdrawing the phase rich in suspended hydrocarbons from the vessel via a draw-off point of the vessel; and withdrawing the water-rich stream via an outlet of the vessel, which outlet is located below the draw-off point.

The vessel may be divided into the calming zone and a suction zone by a dividing means located between the inlet and outlet for creating the calming zone on the inlet side of the dividing means to permit settling of suspended solids in said zone. The dividing means may be in the form of a baffle.

The calming zone may include a settling zone located below the inlet in which the suspended solids may settle.

The settling zone may be defined by a floor of the vessel. The floor of the vessel may slope towards the inlet. Alternatively, the floor of the vessel may be conical, thereby defining the settling zone. In yet a further embodiment, the floor may be stepped towards the inlet so that the settling zone is lowered relative to the remainder of the floor of the vessel.

The settling zone may be defined between the baffle and the inlet of the process vessel.

The method may include the step of withdrawing suspended solids from the settling zone.

The suspended solids may be catalyst fines.

In one embodiment, the dividing means extends between two points on sidewalls of the vessel, on opposing sides of the inlet. The dividing means may engage the floor of the vessel. In this embodiment, a minimum amount of reaction water capable of being retained in the vessel during one residence time may be dictated by the height of the dividing means as the reaction water must be able to flow over the baffle towards the outlet.

The outlet may be located sufficiently low in the sidewall of the process vessel to allow withdrawal of the water-rich phase whilst withdrawing as little as possible of the suspended hydrocarbon phase.

The method may provide more than one draw-off point spaced apart along the height of a side wall of the vessel from the lowest draw-off point to allow the method to be used for various volumes of reaction water and thereby for various levels of water-rich phase.

The location of the lowest draw-off point may be located sufficiently high in the wall of the process vessel to allow withdrawal of the suspended hydrocarbons whilst withdrawing as little as possible of the water-rich phase when the vessel is retaining the minimum amount of reaction water. The lowest draw-off point may be located at about 20% of the vessel height, the height being measured from the highest point of the vessel floor. The spacing between successive draw-off points may be about 10% of the vessel height.

The location of the highest draw-off point may be determined by the maximum level or volume of reaction water in the process vessel during a residence time.

The residence time of the reaction water in the process vessel may be determined by the volume of reaction water in the vessel during a residence time.

The minimum residence time to achieve sufficient separation of the suspended hydrocarbon and the water-rich phase is about four hours, whilst the preferred residence time is greater than about six hours, typically eight hours or more.

According to a further aspect of the invention there is provided a process vessel for separating a multi-component stream, the vessel including:

an inlet for permitting introduction of a reaction water stream to the vessel;

an outlet for withdrawing a water-rich phase from the vessel;

one or more draw-off points for drawing off a phase rich in suspended hydrocarbons from the vessel, the draw-off point(s) being located above the outlet; and a dividing means located between the inlet and outlet for creating a calming zone on the inlet side of the baffle to permit settling of suspended solids in said zone; wherein a residence time of the reaction water stream in the process vessel is at least four hours.

A floor of the vessel may slope towards the inlet to define a settling zone for the suspended solids. Alternatively, the floor of the vessel may be conical, thereby defining the settling zone. In yet a further embodiment, the floor may be stepped towards the inlet so that the settling zone is lowered relative to the remainder of the floor of the vessel.

Once the suspended solids have settled in the settling zone, they are generally not disturbed by the flow of reaction water through the vessel.

As the dividing means separates the inlet from the outlet, suction on the outlet does not disturb the settled suspended solids.

The suspended solids may be catalyst fines.

The inlet and outlet may be located substantially opposite each other.

A minimum amount of reaction water capable of being retained in the vessel during one residence time may be dictated by the height of the dividing means as the reaction water must be able to flow over the dividing means towards the outlet.

The dividing means may extend between two points on sidewalls of the vessel, on opposing sides of the inlet. The dividing means may engage the floor of the vessel.

The dividing means may extend to at least one third of the height of the working volume of the vessel. The working volume of the vessel is the volume located above the highest point of the vessel floor.

When viewed in plan, the dividing means may be located closer to the outlet than the inlet of the process vessel.

The dividing means may be in the form of a baffle.

The outlet may be located sufficiently low in a sidewall of the process vessel to allow withdrawal of the water-rich phase whilst withdrawing as little as possible of the suspended hydrocarbon phase.

The vessel may include a plurality of draw-off points that may be spaced apart along the height of the vessel side wall from the lowest draw-off point to allow the vessel to accommodate varying levels of the water-rich phase.

The location of the lowest draw-off point may be located sufficiently high in the wall of the process vessel to allow withdrawal of the suspended hydrocarbons whilst withdrawing as little as possible of the water-rich phase when the vessel is retaining the minimum amount of reaction water. The lowest draw-off point may be located at about 20% of the vessel height, the height being measured from the highest point of the vessel floor. The spacing between successive draw-off points may be about 10% of the vessel height.

The location of the highest draw-off point may be determined by the maximum level or volume of reaction water in the process vessel during a residence time.

The process vessel may be circular when viewed in plan.

The residence time of the reaction water in the process vessel may be determined by the volume of reaction water in the vessel during a residence time. The minimum residence time to achieve sufficient separation of the suspended hydrocarbon and the water-rich phase is about four hours, whilst the preferred residence time eight hours or more.

The process vessel may be provided with a level indicator to indicate the level of reaction water in the vessel so that a suitable draw-off point may be selected according to the height of the level.

In use, once the residence time has passed, the suspended hydrocarbon phase may be removed from the vessel via a suitable draw-off point in a first step, after which the water-rich phase may be removed via the outlet in a second step.

The suspended solids/catalyst fines settled in the settling zone may be allowed to remain in the vessel. Alternatively, the suspended solids may be withdrawn via an outlet located in the settling zone.

Apart from acting as a means for separating the hydrocarbon-rich phase, the water-rich phase and the catalyst fines, the process vessel also acts as a buffer to help maintain the feed composition to the distillation column at a relatively constant composition and flow, even during plant upsets.

BRIEF DESCRIPTION OF THE DRAWINGS

The invention will now be described by way of the following, non-limiting examples with reference to the accompanying drawings.

DETAILED DESCRIPTION OF THE PREFERRED EMBODIMENT

Figure 1:
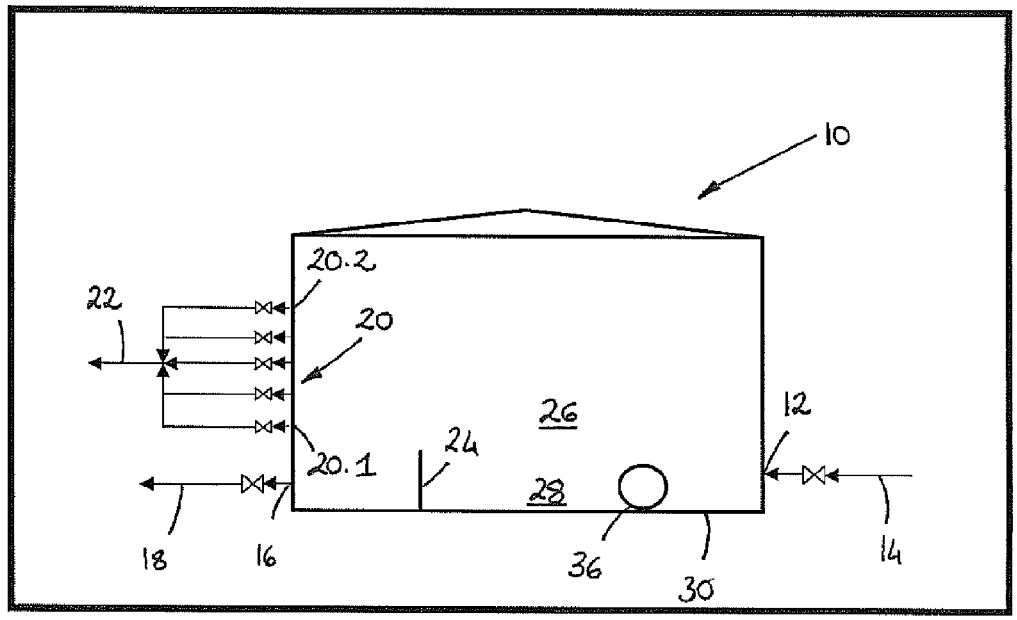
FIG. 1 shows a schematic side view of an embodiment of a process vessel for separating a multi-component stream.

In the drawings, reference numeral 10 generally indicates an embodiment of a process vessel in accordance with the present invention.

The process vessel 10 for separating a multi-component stream includes an inlet 12 for permitting introduction of reaction water stream 14 into the vessel 10 and an outlet 16 for withdrawing a water-rich phase 18 from the vessel 10.

In the embodiments shown, the working volume of the vessel is 11000 m$^3$ and the typically feed rate of reaction water 14 is 840 m$^3$/h. In this case, the residence time is 13.1 hours. The reaction water stream 14 typically includes 4.8 mass % of non-acid chemicals and 1.1 mass % acids, with the remainder being water.

The vessel 10 further includes a plurality of draw-off points 20 for drawing off a phase 22 rich in suspended hydrocarbons from the vessel, the draw-off point(s) being located above the outlet 16.

Figure 4:
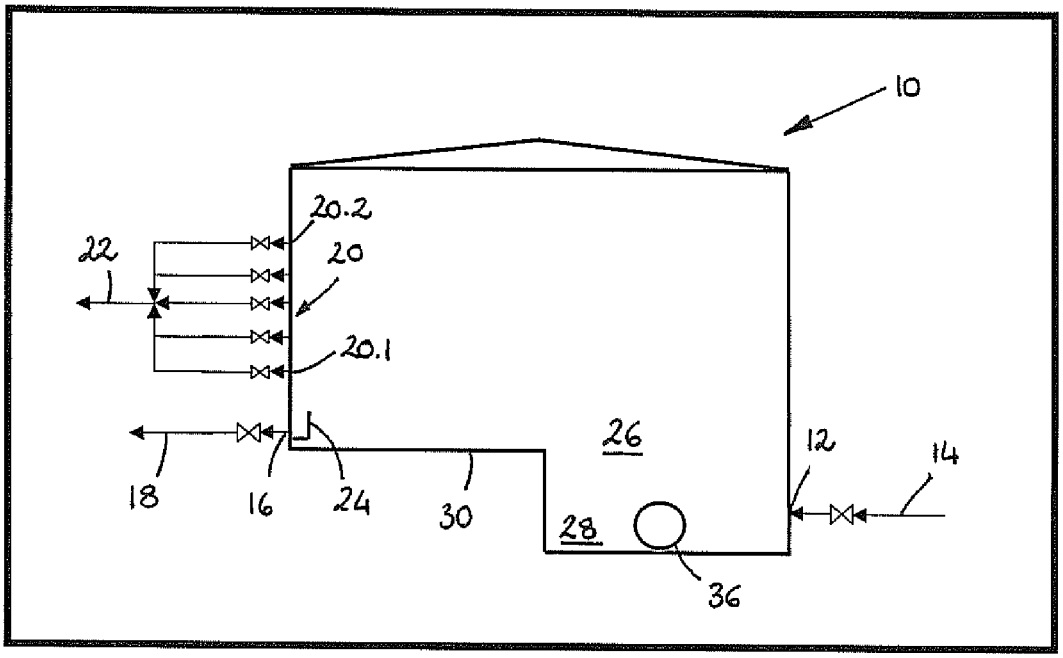
FIG. 4 shows a schematic side view of an embodiment of a process vessel for separating a multi-component stream.

A dividing means in the form of a baffle 24 (see FIGS. 1, 2 and 4) is located between the inlet 12 and outlet 16 for creating a calming zone 26 on the inlet side of the baffle 24 to permit settling of suspended solids in the form of catalyst fines in a settling zone 28.

A residence time of the reaction water stream 14 in the process vessel 10 is at least four hours and is preferably about eight hours or more.

Figure 2:
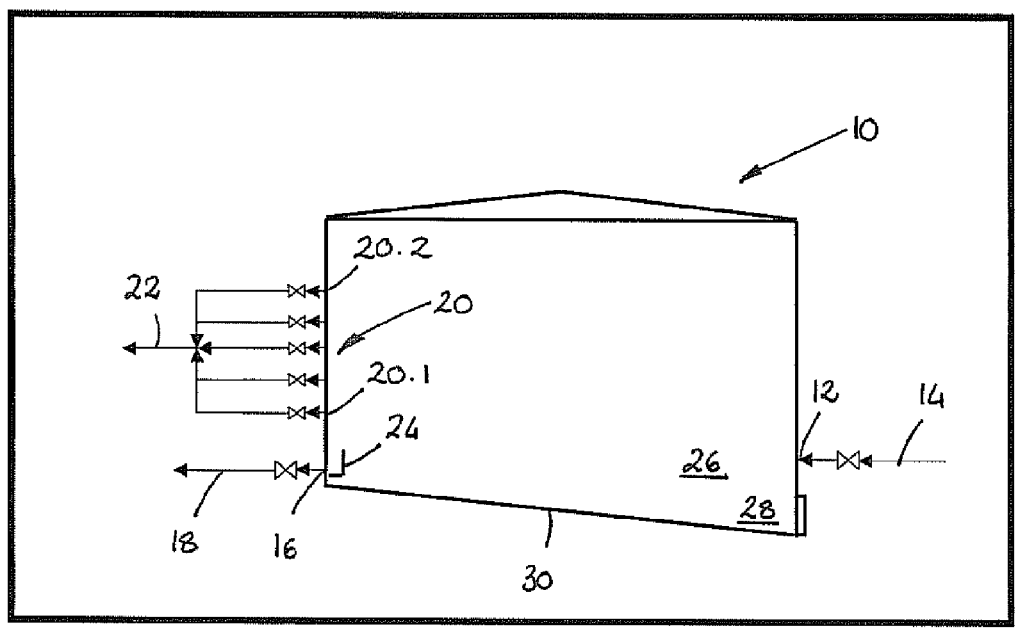
FIG. 2 shows a schematic side view of an embodiment of a process vessel for separating a multi-component stream.
Figure 3:
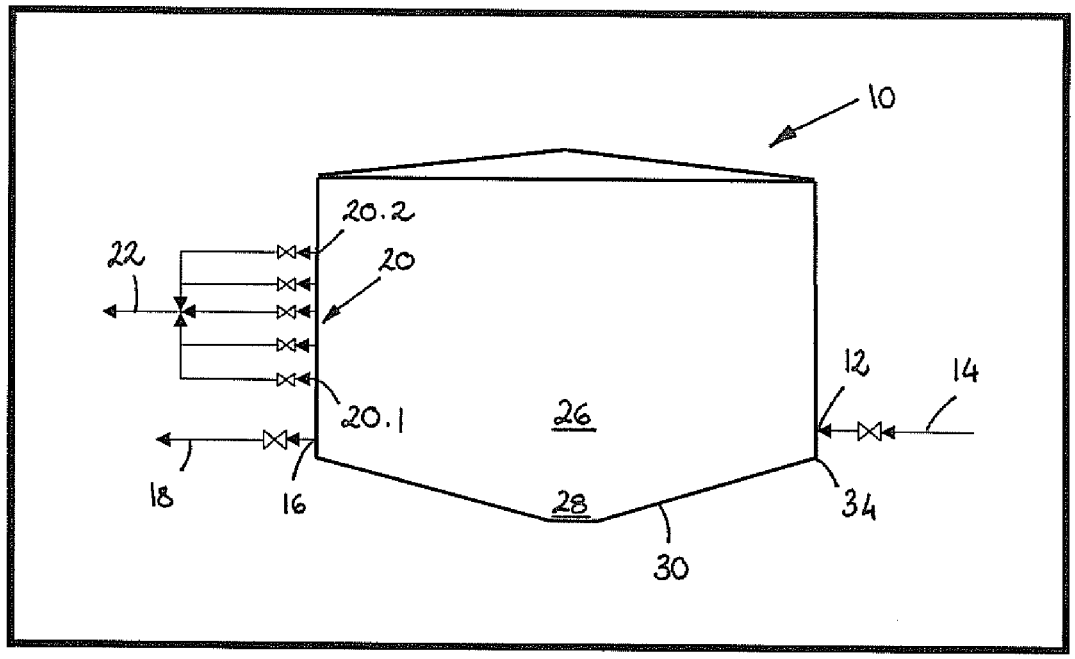
FIG. 3 shows a schematic side view of an embodiment of a process vessel for separating a multi-component stream.

In the embodiment shown in FIG. 1, a floor 30 of the vessel 10 is substantially horizontal. In the embodiment shown in FIG. 2, the floor 30 slopes towards the inlet 12, whilst in the embodiment of FIG. 3, the floor 30 is conical in shape. In the embodiment shown in FIG. 4, the floor 30 is stepped towards the inlet 12 so that the settling zone 28 is lowered relative to the remainder of the floor 30 of the vessel 10.

The settling zone 28 is defined at the lowermost point of the floor 30. Accordingly, settled catalyst fines are generally not disturbed by the flow of reaction water 14 through the vessel 10. As the baffle 24 separates the inlet 12 from the outlet 16, suction on the outlet 16 does not disturb the settled fines.

The inlet 12 and outlet 16 are located substantially opposite each other with the baffle 24 between them.

A minimum amount of reaction water 14 capable of being retained in the vessel 10 during one residence time is dictated by the height of the baffle 24 as the reaction water 14 must be able to flow over the baffle 24 towards the outlet 16.

The outlet 16 is located sufficiently low in a sidewall 32 of the process vessel 10 to allow withdrawal of the water-rich phase 18 whilst withdrawing as little as possible of the suspended hydrocarbon phase 22.

The draw-off points 20 are spaced apart along the height of the vessel side wall 32 from the lowest draw-off point 20.1 to allow the vessel 10 to accommodate varying levels of reaction water 14 and thereby of water-rich phase 18.

The location of the lowest draw-off point 20.1 is located sufficiently high in the side wall 32 of the process vessel 10 to allow withdrawal of the suspended hydrocarbons phase 22 whilst withdrawing as little as possible of the water-rich phase 18 when the vessel 10 is retaining the minimum amount of reaction water 14.

The lowest draw-off point 20.1 is typically located at about 20% of the vessel height, the height being measured from the highest point 34 of the vessel floor 30. The spacing between successive draw-off points 20 is typically about 10% of the vessel height.

The location of the highest draw-off point 20.2 is determined by the maximum level or volume of reaction water 14 in the process vessel 10 during a residence time.

The process vessel 10 is typically circular in plan view and the baffle 24 extends between two points on the sidewall 32 of the vessel 10. The baffle 24 engages the floor 30 of the vessel 10 and extends to at least one third of the height of the working volume of the vessel 10. The working volume of the vessel 10 is the volume located above the highest point 34 of the floor 30.

When viewed in plan, the baffle 24 is located closer to the outlet 16 than the inlet 12 of the process vessel 10.

The residence time of the reaction water 14 in the process vessel 10 is determined by the volume of reaction water 14 in the vessel 10 during a residence time. The minimum residence time to achieve sufficient separation of the suspended hydrocarbon phase 22 and the water-rich phase 18 is about four hours, whilst the desired residence time is about eight hours or more.

The process vessel 10 is provided with a level indicator (not shown) to indicate the level of reaction water 14 in the vessel 10 so that a suitable draw-off point 20 can be selected according to the height of the level of the suspended hydrocarbon phase.

The vessel 10 is suitable for use in a method of separating a multi-component stream in accordance with the invention.

The method includes the step of feeding the reaction water stream 14 to the process vessel 10 via the inlet 12 located at the calming zone 16 of said vessel 10.

The reaction water stream 14 is allowed to remain in the vessel 10 for a minimum residence time of four hours to allow the reaction water stream 14 to separate into the phase rich in suspended hydrocarbons 22 and the water-rich phase 18 and to allow catalyst fines to settle out of the reaction water stream 14 at a settling zone 28.

As a next step, the phase 22 rich in suspended hydrocarbons is withdrawn from the vessel 10 via one of the draw-off points.

As a final step, the water-rich stream 18 is withdrawn from the vessel 10 via the outlet 16 which is located below the draw-off point 20.

The catalyst fines settled at the floor 30 of the vessel 10 are allowed to remain in the settling zone. Alternatively, the can be drawn off via outlet 36 shown in FIGS. 1 and 4.

It is to be appreciated, that the invention is not limited to any particular embodiment or configuration as hereinbefore generally described or illustrated.

All references cited herein are incorporated herein by reference in their entirety. To the extent publications and patents or patent applications incorporated by reference contradict the disclosure contained in the specification, the specification is intended to supersede and/or take precedence over any such contradictory material.

Terms and phrases used in this application, and variations thereof, unless otherwise expressly stated, should be construed as open ended as opposed to limiting. As examples of the foregoing, the term 'including' should be read to mean 'including, without limitation' or the like; the term 'comprising' as used herein is synonymous with 'including,' 'containing,' or 'characterized by,' and is inclusive or open-ended and does not exclude additional, unrecited elements or method steps; the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise. In addition, as used in this application, the articles 'a' and 'an' should be construed as referring to one or more than one (i.e., to at least one) of the grammatical objects of the article. By way of example, 'an element' means one element or more than one element.

The presence in some instances of broadening words and phrases such as 'one or more', 'at least', 'but not limited to', or other like phrases shall not be read to mean that the narrower case is intended or required in instances where such broadening phrases may be absent.

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for separating a multi-component stream, comprising:
    providing a process vessel which is divided into a calming zone and a suction zone by a dividing means located between an inlet and an outlet, wherein the dividing means is configured to create the calming zone on the inlet side of the dividing means to permit settling of suspended solids in the calming zone;
    feeding a reaction water stream to the process vessel via the inlet located at the calming zone of the vessel, wherein the reaction water stream is derived from a Fischer-Tropsch reaction water stream after exiting a three-phase separator, and wherein the reaction water stream contains non-acid chemicals, water, acids, suspended solids and suspended hydrocarbons;
    allowing the reaction water stream to remain in the process vessel for a minimum residence time of four hours to allow the reaction water stream to separate into a phase rich in suspended hydrocarbons and a water-rich phase and to allow suspended solids to settle out of the reaction water stream;
    withdrawing the phase rich in suspended hydrocarbons from the vessel via a draw-off point of the process vessel, wherein the draw-off point is selected from two or more draw-off points; and
    withdrawing the water-rich phase via the outlet of the process vessel, wherein the outlet is located below the draw-off point.

2. The method of claim 1, wherein the dividing means is a baffle.

3. The method of claim 1, wherein the calming zone comprises a settling zone wherein the suspended solids settle, wherein the settling zone is located below the inlet.

4. The method of claim 3, wherein the settling zone is defined by a floor of the process vessel, wherein the floor is conical in shape.

5. The method of claim 1, further comprising:
    withdrawing suspended solids from the process vessel.

6. The method of claim 1, wherein the suspended solids are catalyst fines.

7. The method of claim 1, wherein the dividing means extends between two points on sidewalls of the process vessel, on opposing sides of the inlet, and extends from a floor of the vessel.

8. The method of claim 1, wherein the outlet is located sufficiently low in the sidewall of the process vessel so as to allow withdrawal of the water-rich phase while withdrawing as little as possible of the suspended hydrocarbon phase.

9. The method of claim 1, wherein more than one draw-off point is provided, wherein the draw-off points are spaced apart along a height of a side wall of the process vessel from a lowest draw-off point so as to allow various volumes of reaction water to be employed, and thereby to allow for various levels of water-rich phase.

10. The method of claim 1, wherein a location of a lowest draw-off point is located sufficiently high in a wall of the process vessel to allow withdrawal of the suspended hydrocarbon phase while withdrawing as little as possible of the water-rich phase when the process vessel retains a minimum amount of reaction water.

11. The method of claim 1, wherein a residence time of the reaction water in the process vessel is eight hours.

12. A process vessel for separating a multi-component stream, comprising:
    an inlet configured to permit introduction of a reaction water stream to the process vessel;
    an outlet for withdrawing a water-rich phase from the process vessel;
    two or more draw-off points for drawing off a phase rich in suspended hydrocarbons from the process vessel, wherein the draw-off points are located above the outlet; and
    a dividing means located between the inlet and the outlet, wherein the dividing means extends from a floor of the process vessel; wherein the dividing means is configured to create a calming zone on an inlet side of a baffle configured to permit settling of suspended solids in the calming zone; wherein the floor of the process vessel is conical in shape and slopes towards the inlet thereby defining a settling zone for the suspended solids such that, in use, a residence time of the reaction water stream in the process vessel is at least four hours.

13. The process vessel of claim 12, wherein the floor of the process vessel is stepped towards the inlet so that the settling zone is defined that is lower relative to a remainder of the floor of the process vessel.

14. The process vessel of claim 12, wherein the suspended solids are catalyst fines.

15. The process vessel of claim 12, wherein the inlet and the outlet are located substantially opposite each other.

16. The process vessel of claim 12, wherein the dividing means extends from the floor of the process vessel to at least one third of a height of a working volume of the process vessel.

17. The process vessel of claim 12, wherein the dividing means is a baffle.

18. The process vessel of claim 12, wherein the outlet is located sufficiently low in a sidewall of the process vessel so as to allow, in operation, withdrawal of the water-rich phase while withdrawing as little as possible of the suspended hydrocarbon phase.

19. The process vessel of claim 12, wherein the two or more draw-off points are spaced apart along a height of a side wall of the process vessel from a lowest draw-off point, so as to allow the vessel to accommodate, in operation, varying levels of water-rich phase.

20. The process vessel of claim 19, wherein a location of the lowest draw-off point is located sufficiently high in the wall of the process vessel so as to allow, in operation, withdrawal of the suspended hydrocarbon phase while withdrawing as little as possible of the water-rich phase when the vessel retains a minimum amount of reaction water.

21. The process vessel of claim 19, wherein the lowest draw-off point is located at about 20% of a process vessel height, wherein the height is measured from a highest point of the process vessel floor.

22. The process vessel of claim 20, wherein a lowest draw-off point is located at about 20% of a process vessel height, wherein the height is measured from a highest point of the process vessel floor.

23. The process vessel of claim 21, wherein a spacing between successive draw-off points is about 10% of the process vessel height.

24. The process vessel of claim 19, wherein a location of a highest draw-off point is determined by a maximum level or a maximum volume of reaction water in the process vessel during a residence time while in operation.

25. The process vessel of claim 12, wherein the residence time is eight hours.

26. The process vessel of claim 12, further comprising a level indicator configured to indicate a level of reaction water in the vessel so that a suitable draw-off point is selectable according to a height of the level.

* * * * *